United States Patent
Fischer et al.

(10) Patent No.: US 11,613,214 B2
(45) Date of Patent: Mar. 28, 2023

(54) INSERT COMPONENT FOR AN INTERIOR COMPONENT OF A VEHICLE, INTERIOR COMPONENT FOR A VEHICLE, AND VEHICLE

(71) Applicant: Bayerische Motoren Werke Aktiengesellschaft, Munich (DE)

(72) Inventors: Stefan Fischer, Geisenhausen (DE); Michael Hattensperger, Inning am Holz (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 507 days.

(21) Appl. No.: 16/798,865

(22) Filed: Feb. 24, 2020

(65) Prior Publication Data
US 2020/0189489 A1 Jun. 18, 2020

Related U.S. Application Data

(63) Continuation of application No. PCT/EP2018/071258, filed on Aug. 6, 2018.

(30) Foreign Application Priority Data

Aug. 25, 2017 (DE) ............. 10 2017 214 885.3

(51) Int. Cl.
*B60R 13/02* (2006.01)
*B29C 44/14* (2006.01)
(Continued)

(52) U.S. Cl.
CPC ............. *B60R 13/02* (2013.01); *B29C 44/14* (2013.01); *B29K 2027/06* (2013.01); *B29K 2075/00* (2013.01); *B29L 2031/3005* (2013.01)

(58) Field of Classification Search
CPC ......... B60R 13/02; B29C 44/14; B29C 44/06; B29C 44/145; B29K 2027/00; B29K 2027/06; B29L 2031/3005
See application file for complete search history.

(56) References Cited

U.S. PATENT DOCUMENTS

2003/0041955 A1  3/2003 Spengler
2006/0208539 A1  9/2006 Ludwig et al.
(Continued)

FOREIGN PATENT DOCUMENTS

CN    1833941 A    9/2006
CN    102837647 A  12/2012
(Continued)

OTHER PUBLICATIONS

PCT/EP2018/071258, International Search Report dated Oct. 19, 2018 (Two (2) pages).
(Continued)

*Primary Examiner* — Lori L Lyjak
(74) *Attorney, Agent, or Firm* — Crowell & Moring LLP

(57) ABSTRACT

An insert component for an interior component of a vehicle, where the interior component includes a molded skin element and a foam body which is introduced between the insert component and the molded skin element using a foaming process. The insert component has a body portion in order to remain in the interior component and an edge section for supporting the production of the interior component. The edge section at least in a first portion has a lesser thickness as compared to the body portion.

10 Claims, 3 Drawing Sheets

(51) Int. Cl.
    *B29K 27/06*   (2006.01)
    *B29K 75/00*   (2006.01)
    *B29L 31/30*   (2006.01)

(56) References Cited

U.S. PATENT DOCUMENTS

2010/0123332 A1   5/2010   Hotary et al.
2015/0028509 A1   1/2015   Dutouquet et al.

FOREIGN PATENT DOCUMENTS

| DE | 20 2008 017 784 U1 | 7/2010 | |
| DE | 102010021123 A1 * | 11/2011 | ......... B29C 44/1276 |
| DE | 10 2011 010 881 A1 | 8/2012 | |
| EP | 1190828 A1 * | 3/2002 | ............. B29C 33/44 |
| WO | WO 2013/030090 A1 | 3/2013 | |

OTHER PUBLICATIONS

German Search Report issued in German counterpart application No. 10 2017 214 885.3 dated Jun. 20, 2018, with Statement of Relevancy (Seven (7) pages).
Chinese Office Action issued in Chinese application No. 201880042820.3 dated Aug. 15, 2022, with English translation (Thirteen (13) pages).

\* cited by examiner

INSERT COMPONENT FOR AN INTERIOR COMPONENT OF A VEHICLE, INTERIOR COMPONENT FOR A VEHICLE, AND VEHICLE

CROSS REFERENCE TO RELATED APPLICATIONS

This application is a continuation of PCT International Application No. PCT/EP2018/071258, filed Aug. 6, 2018, which claims priority under 35 U.S.C. § 119 from German Patent Application No. 10 2017 214 885.3, filed Aug. 25, 2017, the entire disclosures of which are herein expressly incorporated by reference.

BACKGROUND AND SUMMARY OF THE INVENTION

The present invention relates to an insert component for an interior component of a vehicle, the interior component comprising at least the insert component, a molded skin element, and a foam body which is introduced in a foaming process between the insert component and the molded skin element, wherein the insert component comprises a body portion in order to remain in the interior component and an edge section for supporting the production of the interior component. Moreover, the invention relates to an interior component for a vehicle, the interior component comprising at least the insert component, a molded skin element, and a foam body which is introduced in a foaming process between the insert component and the molded skin element. Furthermore the present invention relates to a vehicle with an interior component.

In modern technology it is widely known how to use interior components of vehicles that consist of multiple components. Usually such interior components comprise an insert component, by which oftentimes at least substantially the shape of the interior component is determined and by which a large portion of the stability of the interior component is provided. A surface of the interior component is usually formed by a molded skin element, by which the most diverse haptic surface textures and/or qualities can be provided. Between the insert component and the molded skin element, a foam body is introduced in a foaming process during the manufacture of interior components for vehicles. Almost any given geometry for interior components of vehicles can be provided in this way, and in particular weight can be economized by the use of a foam body.

In order to be able to carry out the foaming process for the production of the interior component, known insert components have an edge region with a clamping edge. This clamping edge is needed only for the production, especially the foaming process of the interior component, and it is removed afterwards. The known insert components have a continuous thickness, especially also in the edge section. The thereby rigidly formed edge section results in large adjustment expense, especially due to a component warpage which usually occurs during the production of the insert component, especially when adjusting the die used during the foaming process to the insert component. In particular, adjustments of the foaming dies to the actual geometry of the insert component may be necessary. Moreover, on account of the usually unavoidable warpage of the insert component, especially the natural rigidity of the edge section during the production of the interior component, there may be contact between the molded skin element and the edge section. This may lead to surface flaws on the interior component. The quality of the interior component may be decreased in this way, even to the extent of total unusability of the produced interior component. Since the edge section is removed after the production of the interior component, the material used for the edge section is furthermore lost. This also represents a drawback of the insert components of the prior art.

Therefore, the problem which the present invention proposes to solve is to at least partly eliminate the above described drawbacks of insert components for interior components of a vehicle, of interior components for a vehicle, and for vehicles. In particular, the problem of the present invention is to provide an insert component, an interior component, and a vehicle which improve the production of an interior component in a simple and cost-effective manner, in particular providing a reduction in the material consumption and an enhanced quality of the produced interior component.

The aforementioned problem is solved by an insert component for an interior component of a vehicle. Moreover, the problem is solved by an interior component for a vehicle and by a vehicle having an interior component. Further features and details of the invention will emerge from the dependent claims, the specification, and the drawings. Features and details which are described in the context of the insert component according to the invention also apply of course in the context of the interior component according to the invention and the vehicle according to the invention, and respectively vice versa, so that constant mutual referencing is or can be done regarding the disclosure of the individual aspects of the invention.

According to a first aspect of the invention, the problem is solved by an insert component for an interior component of a vehicle, the interior component comprising at least the insert component, a molded skin element, and a foam body which is introduced in a foaming process between the insert component and the molded skin element, wherein the insert component comprises a body portion in order to remain in the interior component and an edge section for supporting the production of the interior component. An insert component according to the invention is characterized in that the edge section at least for a portion has a lesser thickness as compared to the body portion.

An insert component according to the invention can be used to manufacture an interior component of a vehicle. Such an interior component comprises at least the insert component, a molded skin element, and a foam body which is introduced in a foaming process between the insert component and the molded skin element. During the manufacture of the interior component, the insert component and the molded skin element are placed in a foaming die and material for the foam body is introduced between the insert component and the molded skin element and foamed there. Preferably after a curing of the foam body, the edge section of the insert component is removed, especially also the segment of the foam body and the molded skin element situated on the edge section. The core segment of the insert component remains in the finished interior component.

According to the invention, it is provided that the edge section at least for a portion has a lesser thickness as compared to the body portion. The body portion of the insert component has a thickness which ensures a stability of the insert component and thus that of the entire interior component produced afterwards. Since the edge section is removed after the foaming process, it need not fulfill these stability criteria. A lesser thickness in the sense of the invention may mean, for example, that the edge section at least partially has a thickness which is less than one third of the thickness, preferably less than one tenth of the thickness, of the body portion. A length of the part of the edge section having a lesser thickness as compared to the body portion may be in particular 40 mm to 80 mm or more. Especially preferably, the greater portion of the edge section is formed with such a lesser thickness, especially 75% of the edge section, especially preferably 90% or more of the edge section.

Such a reduced thickness of the edge section as compared to the body portion brings multiple benefits. On the one hand, due to the lesser thickness of the edge section the material consumption is automatically lowered during the production of the edge section, so that on the whole an insert component according to the invention can be produced with less material expense. Already because of this, costs can be lowered during the production of an insert component according to the invention and thus also an interior component according to the invention.

Furthermore, the edge section, at least the part of the edge section having a lesser thickness as compared to the body portion, also has less stability as compared to the body portion. In this way, it is often already possible to compensate for any warpage occurring during the production of the insert component when it is inserted into the foaming die prior to the foaming process to make the interior component, thanks to the edge section with the lesser thickness for example thanks to a slight deformation of the corresponding part of the edge section. The result may be less adjustment expense between the insert component and the foaming die.

Moreover, during the foaming process when producing the interior component, even when the molded skin element is resting against the edge section, the lesser stability of the edge section with the lesser thickness means that it can yield before the foam body being foamed, so that the foaming process can be carried out without hindrance in this case as well. This may produce a better quality and in particular fewer interior components produced as rejects.

Thus, on the whole, an insert component according to the invention can save on costs already during the production of the insert component. The later production of an interior component having such an insert component can also be improved, especially in regard to time and/or adjustment expense when placing the insert component in a foaming die and by the general better quality of the interior component produced.

Moreover, in an insert component according to the invention it may be provided that the edge section at places of lesser thickness has a thickness of less than 1 mm, in particular less than 0.8 mm, preferably less than 0.6 mm. Even smaller thicknesses are possible for an insert component according to the invention, as long as the material of the insert component allows for this. In particular, with a thickness of less than 1 mm, especially less than 0.8 mm, preferably less than 0.6 mm, it may be ensured that the above described benefits of an insert component according to the invention may be provided. Edge regions with these thicknesses on the one hand can be produced with low material expense and moreover usually have such a low stability that an inserting in a foaming die is especially easily possible, and the foaming process is also assisted when introducing the foam body between the insert component and the molded skin element during the production of the interior component.

Moreover, it may be provided especially preferably in an insert component according to the invention that the edge section is flexible in configuration at least for a portion. In particular, thanks to the lesser thickness, a lesser stability of the edge section can be provided, as already described above. Especially preferably, this lesser stability is designed such that the edge section has a flexible configuration especially in the parts of the edge section having a lesser thickness. This may ensure the benefits, especially a compensating for warpage in the produced insert component, for example, and also assist the foaming process when introducing the foam body between the insert component and the molded skin element during the production of the interior component.

An insert component according to the invention may also be designed such that the edge section is arranged encircling the body portion. Encircling in the sense of the invention may mean in particular that the body portion of the insert component has a cohesive flat shape and that the edge section surrounds the entire edge of this flat shaped body portion. In other words, the body portion is entirely surrounded by an edge section of the insert component. This may be beneficial especially when producing the interior component, since on the one hand an arranging of the insert in the foaming die for the production of the interior component is assisted and simplified, and on the other hand the severing of the edge section after the foaming process can automatically provide an encircling, especially well definable edge of the interior component. In this way, a geometry of the interior component, especially an edge of the interior component, can be provided in especially simple and particularly defined manner by an edge section of the insert component arranged encircling the body portion.

An insert component according to the invention may also be designed such that the insert component is produced in an injection molding process and/or an injection molding/integral foaming process. An injection molding process as well as an injection molding/integral foaming process each represent an especially simple way of producing an insert component according to the invention. Thanks to an injection molding process or an injection molding/integral foaming process, a large variability of possible geometries of an insert component can be provided, especially in regard to the shape of the insert component. Injection molding processes and injection molding/integral foaming processes enable a production of insert components in high lot numbers, which in turn makes possible low production costs.

According to an especially preferred modification of an insert component according to the invention, it can moreover be provided that the insert component is produced in an injection molding/integral foaming process, wherein the edge section is formed at least partly without foamed areas. Especially preferably, these nonfoamed areas form those portions of the edge section having a lesser thickness. The edge sections with lesser thickness can be made especially easily in this way According to a second aspect of the invention, the problem is solved by an interior component for a vehicle, the interior component comprising at least the insert component, a molded skin element, and a foam body which is introduced in a foaming process between the insert component and the molded skin element. An interior component according to the invention is characterized in that the insert component is formed according to the first aspect of the invention. All the benefits which have been described at length in regard to an insert component according to the invention per the first aspect of the invention can thus also be provided by an interior component for a vehicle that has been produced by using an insert component per the first aspect of the invention.

It may be provided especially preferably in an interior component according to the invention that the foam body comprises PU foam. PU (polyurethane) represents a material having especially good properties for use as the foam body for an interior component according to the invention. In particular, thanks to the use of such a PU foam, an especially low weight can be provided with good shape stability at the same time. Besides PU foam, other foam materials may also be used for the foam body of an interior component, preferably but not necessarily having similar properties to PU foam.

Furthermore, it may be provided in an interior component according to the invention that the molded skin element comprises a PVC film and/or a PU film and/or a slush element and/or a placeholder skin element. PVC (polyvinylchloride) films and PU films represent preferred plastic films having especially suitable properties for surfaces of interior components. A slush element likewise usually represents a plastic film element whose surface, due to a sintering process in the production of the slush element, may have the most diverse structures and/or haptics. A placeholder skin element, in turn, is used in an interior component of a vehicle whose surface will be formed later on by another molded skin element, replacing the placeholder skin element. Other materials may also be used for the molded skin element, preferably but not necessarily having similar properties to the above mentioned materials. An especially large number and variability of surface properties of an interior component according to the invention can be provided in this way.

Especially preferably, it may be provided in an interior component according to the invention that the interior component is fashioned as a dashboard. Such a dashboard constitutes an especially large and visible interior component in a vehicle. Especially high demands are placed on the quality and especially the optics and haptics of such a dashboard. These demands can be met in an especially easy and economical manner by an interior component according to the invention which is formed as a dashboard.

According to a third aspect of the invention, the problem is solved by a vehicle having an interior component. A vehicle according to the invention is characterized in that the interior component is formed according to the second aspect of the invention. An interior component according to the second aspect of the invention comprises, as its structural element, an insert component according to the first aspect of the invention. Thus, a vehicle according to the invention has all the benefits which have been described in detail in connection with an interior component according to the second aspect of the invention and in connection with an insert component according to the first aspect of the invention.

Further benefits, features and details of the invention will emerge from the following description, in which exemplary embodiments of the invention are described in detail with reference to the drawings. Each time the features mentioned in the claims and in the description may be essential to the invention in themselves or in any given combination. Elements with the same function and mode of operation are given the same reference numbers in FIGS. 1 to 3.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
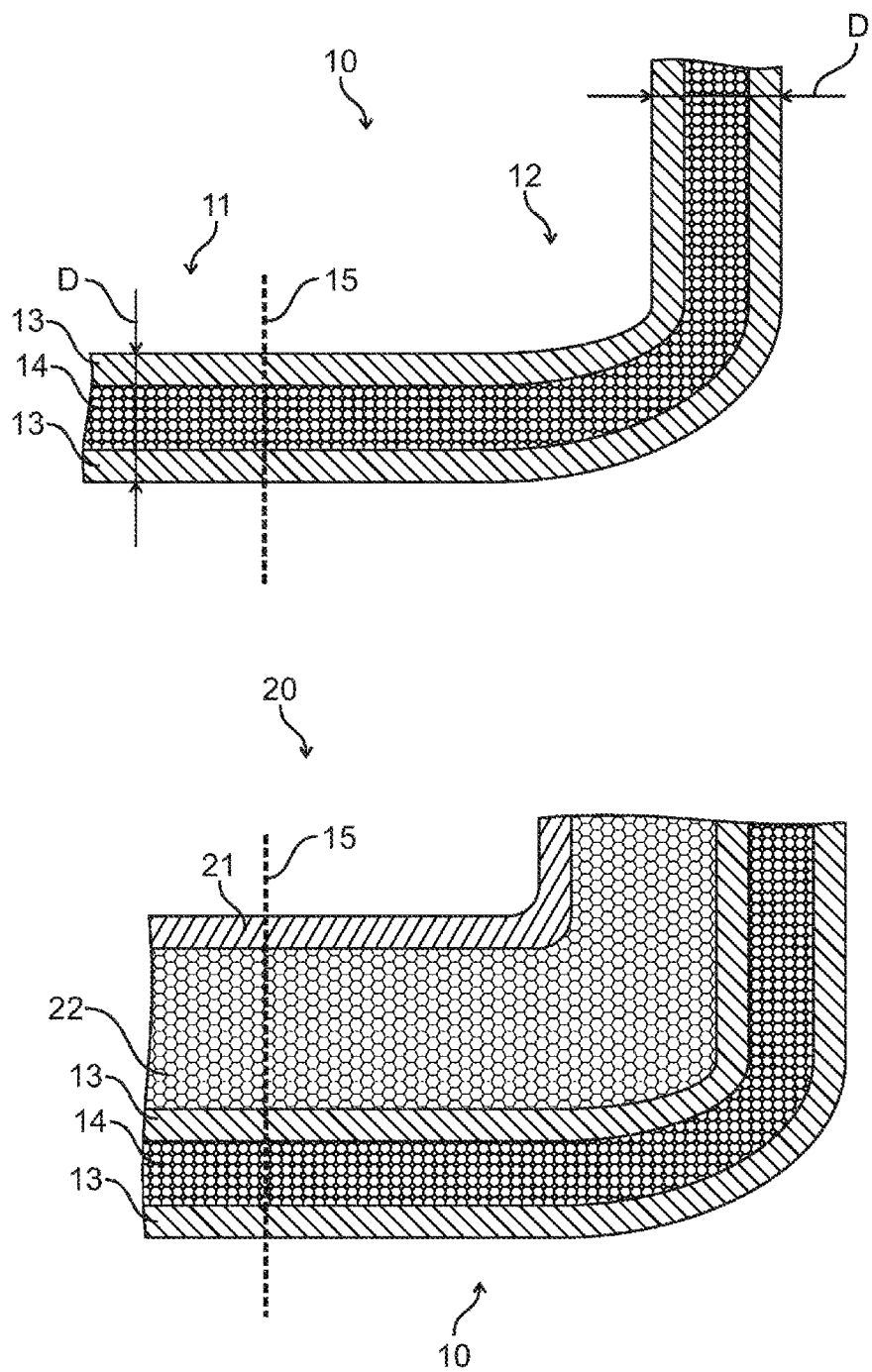
FIG. 1 shows an insert component as well as an interior component according to the prior art.

FIG. 1 shows an insert component 10 (upper figure) as well as an interior component 20 (lower figure) which are formed according to the prior art. Each time a cut-out is shown showing in particular the transition from the body portion 11 to the edge section 12 of the insert component 10. This transition is formed by a cutting boundary 15. An insert component 10 is shown in the upper figure. The insert component 10 is produced in an injection molding/integral foaming process and thus comprises as respective boundaries an insert surface body 13 and an insert foam body 14 situated in between. It is clearly seen that both the body portion 11 and the edge section 12 each have the same thickness D. In the lower figure, the interior component 20 is formed on the insert component 10 shown in the upper figure. A molded skin element 21, for example a PVC film or a slush element, forms the upper termination of the interior component 20, while between the molded skin element 21 and the insert component 10 there is arranged a foam body 22, for example made of PU foam. After the foaming process during which the foam body 22 is created, the interior component 20 is bounded off at the cutting border 15, and in particular the edge section 12 together with the foam body 22 and molded skin element 21 arranged on the edge section 12 is removed. The body portion 11 of the insert component 10 remains in the finished interior component 20. Already here, it is clearly seen that, due to the constant thickness D of the insert component 10, a large material expense is needed in the production of the insert component 10, which is lost on account of the removal at the cutting boundary 15. Also, the edge section 12 is rigid and nonflexible due to the great thickness D of the edge section 12, so that a large adjustment expense is necessary during the placement in a foaming die to introduce the foam body 22. Also, the resting of the molded skin element 21, in particular against the edge section 12 of the insert component 10 may result in an impairment (not shown) of the quality of the resulting interior component 20.

Figure 2:
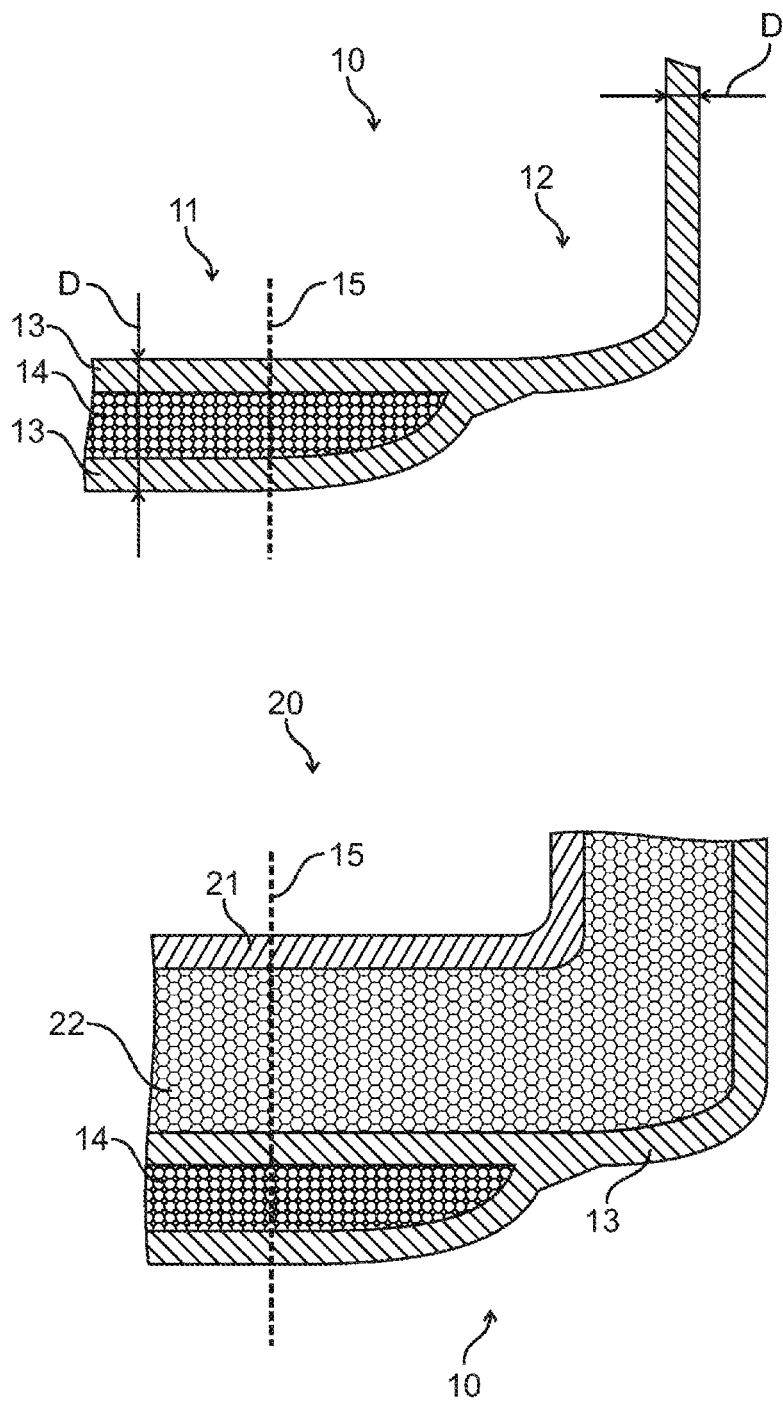
FIG. 2 shows an insert component as well as an interior component according to the invention.

Now, FIG. 2 shows an insert component 10 according to the invention in the upper figure and an interior component 20 according to the invention in the lower figure, which is produced with the aid of this insert component 10 according to the invention. This insert component 10 is also produced in an injection molding/integral foaming process. It can be seen, and is essential to the invention, that the edge section 12 of the insert component 10 according to the invention has at least partly a thickness D which is less than the thickness D of the body portion 11. This may be achieved, for example, in that a foaming of the insert foam body 14 is not done, at least partially, for the edge section 12 during the production of the insert component 10. The lesser thickness D of the edge section 12 brings several benefits. On the one hand, the material expense in the production of the insert component 10 is automatically reduced. Moreover, the stability of the edge section 12 is reduced, in particular the edge section 12 can even be designed to be flexible at least in part. Parts precision, especially a warpage of the insert component 10, can be compensated by this preferably flexible edge section 12 when placing it in a foaming die during the production of an interior component 20 according to the invention. The foaming process itself is also assisted by a preferably flexible edge section 12, since even when a molded skin element 21 of the interior component 20 is supposed to rest against the edge section 12, this can yield during the foaming of the foam body 22 thanks to the configuration of the edge section 12, so that the foam body 22 can develop practically undisturbed. On the whole, an interior component 20 according to the invention can be improved in this way thanks to the use of an insert component 10 according to the invention.

Figure 3:
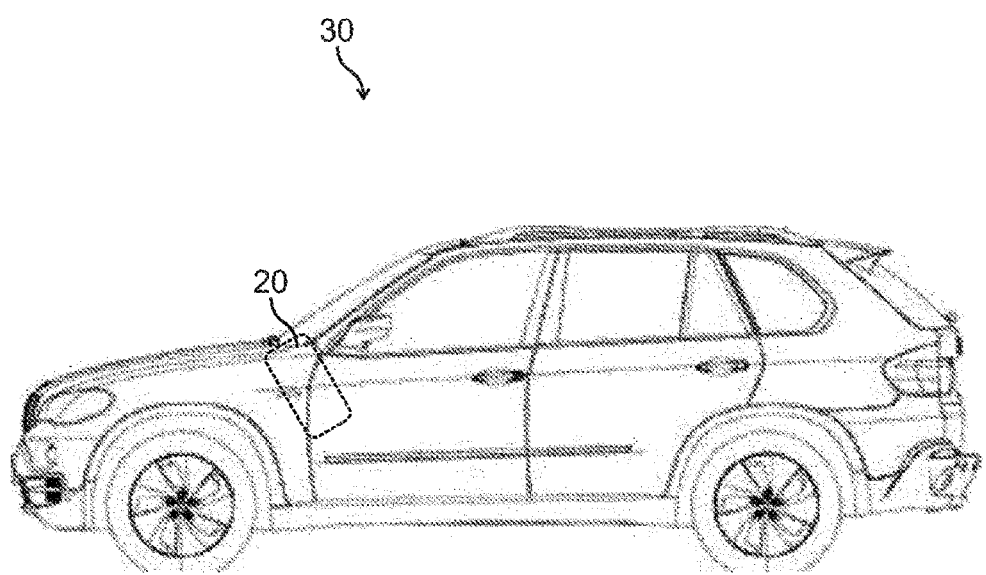
FIG. 3 shows a vehicle according to the invention.

FIG. 3 moreover shows a vehicle 30 according to the invention, in which an interior component 20 according to the invention has been installed. The interior component 20 may be fashioned as a dashboard, for example. Even if this dashboard or the interior component 20 only represents a small portion of the entire vehicle 30, nevertheless the production of the entire vehicle 30 can be improved and in particular be made more economical thanks to the use of an interior component 20 according to the invention.

LIST OF REFERENCE CHARACTERS

10 insert component
11 body portion
12 edge section
13 insert surface body
14 insert foam body
15 cutting border
20 interior component
21 molded skin element
22 foam body
30 vehicle
D thickness The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An insert component for an interior component of a vehicle, wherein the interior component includes a molded skin element and a foam body, comprising:
   a body portion in order to remain in the interior component; and
   an edge section for supporting a production of the interior component;
   wherein the edge section at least in a portion has a lesser thickness as compared to the body portion;
   wherein the edge section is flexible in configuration at least in the portion.

2. The insert component according to claim 1, wherein the portion of the edge section has a thickness of less 1 mm.

3. The insert component according to claim 1, wherein the edge section is disposed encircling the body portion.

4. The insert component according to claim 1, wherein the insert component is produced in an injection molding process and/or an injection molding/integral foaming process.

5. An insert component for an interior component of a vehicle, wherein the interior component includes a molded skin element and a foam body, comprising:
   a body portion in order to remain in the interior component; and
   an edge section for supporting a production of the interior component;
   wherein the edge section at least in a portion has a lesser thickness as compared to the body portion;
   wherein the insert component is produced in an injection molding/integral foaming process and wherein the edge section is formed at least partly without foamed areas.

6. An interior component for a vehicle, comprising:
   an insert component, wherein the insert component includes:
      a body portion; and
      an edge section for supporting a production of the interior component;
      wherein the edge section at least in a portion has a lesser thickness as compared to the body portion;
   a molded skin element; and
   a foam body, wherein the foam body is introduced in a foaming process between the insert component and the molded skin element.

7. The interior component according to claim 6, wherein the foam body comprises polyurethane (PU) foam.

8. The interior component according to claim 6, wherein the molded skin element comprises a polyvinylchloride (PVC) film and/or a polyurethane (PU) film and/or a slush element and/or a placeholder skin element.

9. The interior component according to claim 6, wherein the interior component is a dashboard.

10. A vehicle, comprising:
    the interior component according to claim 6.

* * * * *